United States Patent [19]

Baugh

[11] 4,225,965

[45] Sep. 30, 1980

[54] WRIST-MOUNTED COMMUNICATION DEVICE

[76] Inventor: Gerald R. Baugh, 12444 NW. Kearney, Portland, Oreg. 97229

[21] Appl. No.: 953,121

[22] Filed: Oct. 20, 1978

Related U.S. Application Data

[63] Continuation-in-part of Ser. No. 783,294, Mar. 31, 1977, abandoned.

[51] Int. Cl.[2] .............................................. H04B 1/08

[52] U.S. Cl. ...................................... 455/31; 455/351; 340/407; 340/311

[58] Field of Search ................... 325/361, 466, 55, 64; 340/311, 407, 539

[56] References Cited

U.S. PATENT DOCUMENTS

| | | | |
|---|---|---|---|
| 3,618,070 | 11/1971 | Kagan | 340/407 X |
| 3,937,004 | 2/1976 | Natori et al. | 340/311 |
| 4,157,540 | 6/1979 | Oros | 340/539 |

*Primary Examiner*—Benedict V. Safourek
*Attorney, Agent, or Firm*—Kolisch, Hartwell & Dickinson

[57] ABSTRACT

A communication device adapted to be worn on the wrist to alert the wearer to a transmitted message. The device includes a wrist-mountable housing having a bore positioned to be covered by the wearer's wrist, a probe movably mounted in the housing for selective movement through the bore, and a receiver mounted within the housing and adapted to receive a transmitted message and produce a signal in response thereto. Movement of the probe is controlled by a solenoid which, upon such signal occurring, actuates the probe to prod the wearer's wrist.

2 Claims, 1 Drawing Figure

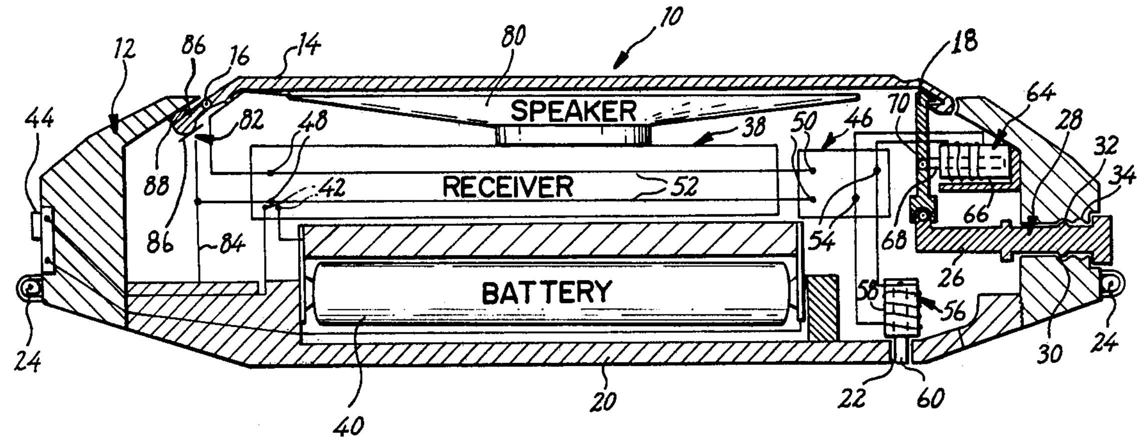
10
12
86
16
14
80
18
SPEAKER
44
82
48
38
50
46
70
64
28
32
34
RECEIVER
52
42
88
86
84
54
68
66
26
BATTERY
58
56
24
40
20
22
60
30
24

WRIST-MOUNTED COMMUNICATION DEVICE

BACKGROUND AND SUMMARY

This application is a continuation-in-part of copending application, Ser. No. 783,294, filed Mar. 31, 1977 now abandoned.

The present invention relates to remote receiving devices, and more particularly, to a device adapted to be worn about the wrist to alert the wearer, by prodding the wearer's wrist, to a transmitted message.

Portable remote receiving devices have achieved widespread use, particularly in inter-building communication systems where it is desired to communicate a message to the receiving person wearing or carrying the device. Typically, such devices have two receiving modes—a first pre-signaling or alerting audible tone mode, and a second message-relaying mode. After receiving the alerting tone, the receiving person places the device in the mode for relaying the spoken message. While this type of receiving device has been generally satisfactory in settings where the noise level is moderate, it is obviously of limited use in noisy settings, such as in construction or logging operations involving heavy machinery, chain saws, or the like.

One important object of the present invention is to provide a remote receiving device which is capable of alerting the wearer in a high-noise area to the reception of a message.

More specifically, it is an object of the invention to provide such device adapted to be worn about the wrist, and which alerts the wearer to an incoming message or to an impending situation of danger, by prodding the wearer's wrist.

The present invention in remote receiving device includes a wrist-mountable housing adapted to be strapped to the wearer's wrist, and having a bore positioned to be covered by the wearer's wrist, a probe movably mounted within the housing for selective movement through the bore, and a receiver mounted within the housing and adapted to receive a transmitted message, and to produce a signal in response thereto. Such signal is relayed, through a control switch, to a solenoid controlling the probe, to produce movement of the probe which results in the prodding of the wearer's wrist. The device may additionally include an audible alarm or speaker which is electrically connected to the receiver upon such signal being produced.

These and other objects and features of the present invention will become more fully apparent when read in connection with the following detailed description of a preferred embodiment of the invention, and the accompanying drawing, showing the invention in an enlarged scale, partly in section.

Detailed Description of a Preferred Embodiment of the Invention

Looking now at FIG. 1, there is shown at 10 a communication apparatus constructed according to a preferred embodiment of the invention. The wrist-mountable housing 12 of the apparatus includes a hinged lid 14 which is shiftable about a hinged connection 16 between a closed position as shown, wherein the lid is locked in position by an upright arm 18 through mutually engaging projections on each, and an opened position wherein the interior of the housing is exposed. In its locked position, lid 14 serves to protect the apparatus against moisture and airborne debris. Extending through the lower plate 20 of housing 12, opposite lid 14, is a bore 22, which, when the device is being worn, covers the wearer's wrist. Housing 12 additionally includes a pair of opposed mounting pins 24 by which a conventional wrist strap may be attached thereto.

Extending through the right wall of housing 12 in the drawing is a manually operable push/pull switch 28 used in the manual operation of hinged lid 14. Switch 28 is manually shiftable between a closed position, shown in the drawing, wherein an annular sleeve 30 integrally formed with the switch stem is releasably received within an inner groove 32 formed within the housing wall, and an opened position (not shown) wherein the sleeve is releasably received within an outer groove 34. Arm 18 is pivotally connected at its lower end to the left side of switch 28 in the drawing, and is controlled thereby in a manner to be described.

Receiver means including a receiver 38 is mounted within housing 12 for receiving and responding to a transmitted message, and producing, upon receipt of such a message, a response signal. Receiver 38 is a known type of radio receiver capable of resonding to VHF-transmitted signals. Preferably, the receiver is tunable, by means of a tuning control dial (not shown) to a plurality of different VHF signal frequencies. Receiver 38 is powered by a battery 40 mounted within the housing and electrically connected to the receiver battery terminals 42 through an on/off switch 44 located at the left side of the housing in the drawing.

A switching device 46 is electrically connected at its input terminals 50 to the receiver output terminals 48 via conductors 52. Device 46 is powered by battery 40 and is operable, upon receipt of a signal from the receiver, to produce at the device's output terminals 54 a succession of timed pulses, each having an amplitude substantially that of the battery voltage. Details of the circuitry of a device, such as device 46, operable to perform the just-described switching operation, are well known to those skilled in the art. Device 46 forms, in conjunction with the two solenoids described below, control means for effecting control over the operation of the apparatus in response to a signal produced by receiver 38, in a manner to be described.

A first, or probe solenoid, indicated at 56, includes a magnetic coil 58 mounted within housing 12 adjacent core 22, and a movable core, or probe 60 which is positioned and dimensioned to extend through bore 22 well beyond the exterior face of plate 20, upon energization of coil 58. Solenoid 56 is electrically connected to terminals 54 of device 46 for responding to the output thereof, upon production of a response signal. Solenoid 56, including probe 60 is also referred to herein as first response means.

A second, or lid-controlling solenoid 64 includes a coil 66 secured to the inner wall of housing 12, as shown, and a movable core 68 which is actuatable upon energization of coil 66 to produce movement of the core in the right-to-left direction. The left end of core 68 in the drawing is pivotally attached at 70 to a central portion of arm 18, providing a fixed pivot point for the arm when solenoid 64 is in nonactivated condition. Solenoid 64, like solenoid 56, is connected to terminals 54 of device 46 for responding to the output thereof. Solenoid 64 and arm 18 pivotally attached thereto are also referred to herebelow as second response means.

Thus, considering the structure described above, it can be appreciated that arm 18 can be shifted in a counter-clockwise direction in the drawing to effect opening of lid 14 in one of two ways. With solenoid 64 in a nonactivated condition, switch 28 can be pulled to its opened position, wherein arm 18 pivots in a counter-clockwise direction about the end of core 68 to disengage the upper portion of arm 18 from the lid. Secondly, with switch 28 placed in its closed position, solenoid 64 can be actuated to produce shifting of core 68 in a right-to-left direction in the drawing, causing arm 18 to pivot about its lower end to disengage the arm from the lid.

Apparatus 10 additionally includes an audible alarm device 80 mounted within housing 12. Device 80, which is exposed and concealed when lid 14 is placed in opened and closed positions, respectively, is preferably a speaker, the cone of which is directed toward lid 14. A switch, indicated at 82, is closable to connect receiver 32 to device 80. More particularly, switch 82 includes a first spring contact member 84 connected to one of receiver terminals 48, and a second contact member 86 mounted on the lid adjacent pivot point 16 and connected to the speaker. Movement of the hinged lid from its closed to opened position brings member 86 into contact with member 84 to close the receiver-speaker circuit.

A leaf spring 88 connecting housing 12 with the portion of lid 14 adjacent member 86 biases lid 14 toward its opened position. Thus, as the lid is opened, either through the manual or electronic control of arm 18, as described above, the lid springs toward an opened position to maintain the two contact members of switch 82 in electrical contact until the lid is manually moved to its closed position.

Describing now the operation and use of the present communication apparatus, when a transmitted signal is received by apparatus 10, a receiver-produced response signal, acting through device 46, produces a succession of timed pulses to solenoids 56, 64, producing repeated, simultaneous energization of the two solenoids. Such energization produces, in solenoid 56, an up-and-down motion of probe 60 through bore 22 to prod the wearer's wrist, thus to alert the wearer to the receipt of a message. Initial energization of solenoid 64 causes the release of lid 14 in the manner described, which lid, under the biasing action of spring 88, shifts to its opened position, exposing device 80 and connecting the same to the receiver through switch 82.

Upon termination of the message, and hence termination of the signal-produced output of device 46 to solenoids 56, 64, probe 60 retracts through bore 22, and core 68 is positioned, as shown in the drawing, to orient arm 18 in its substantially vertical, lid-locking, engaging position.

There has thus been described a communication device adapted to be worn about the wrist, which is operable, on receipt of a transmitted message, to alert the wearer to the same by physically prodding the wearer's wrist. Various modifications and changes in the device may be made without departing from the spirit of the invention.

It is claimed and desired to secure by letters patent:

1. Communication apparatus adapted to be worn on the wrist to alert the wearer to a transmitted message, said device, in operative condition, comprising
   - a wrist-mounted housing defining a bore covered by the wearer's wrist, and including a hinged lid movable between opened and closed positions,
   - first response means including a probe movably mounted in said housing for movement through said bore, to prod the wearer's wrist,
   - second response means including a latch arm movable to effect locking and unlocking of said lid, with said lid in its closed position,
   - an audible alarm device mounted on said housing, said device being exposed and concealed when said lid is in its said opened and closed positions, respectively,
   - receiver means mounted in said housing, adapted to receive and respond to a transmitted message, and operable, with receipt of such a message, to produce a response signal, and
   - control means operatively connecting said receiver means and each of said first and second response means, to produce movement in each of the latter with production by said receiver means of a response signal, thereby to produce probe movement, and lid unlocking, respectively.

2. The apparatus of claim 1 which further comprises a switch which is closable to connect said receiver means and said alarm device, with movement of said lid toward its opened position effecting closure of said switch.

* * * * *